J. G. ALLEN.
INDICATOR FOR STAMPING MACHINES.
APPLICATION FILED JUNE 28, 1915.
1,219,418.
Patented Mar. 20, 1917.
2 SHEETS—SHEET 2.
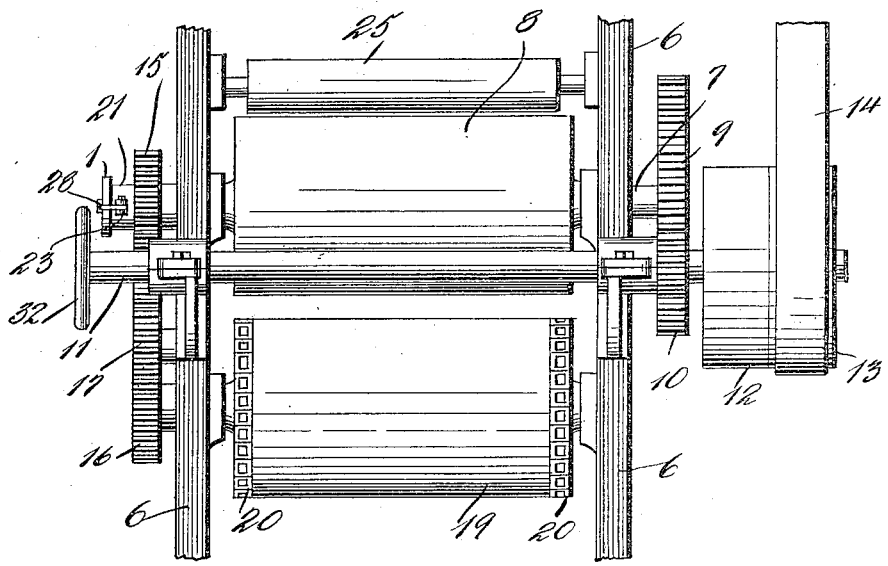
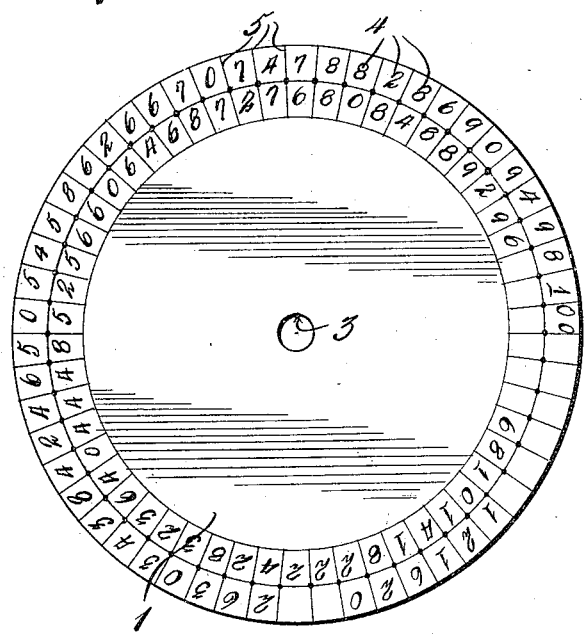
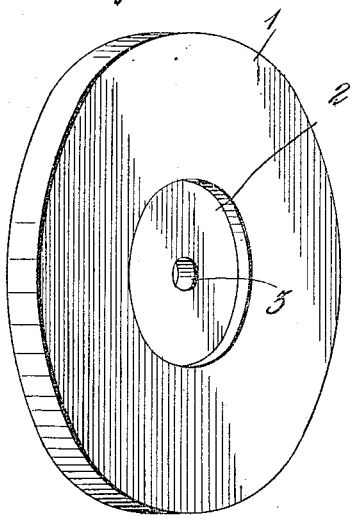
Inventor
James G. Allen.

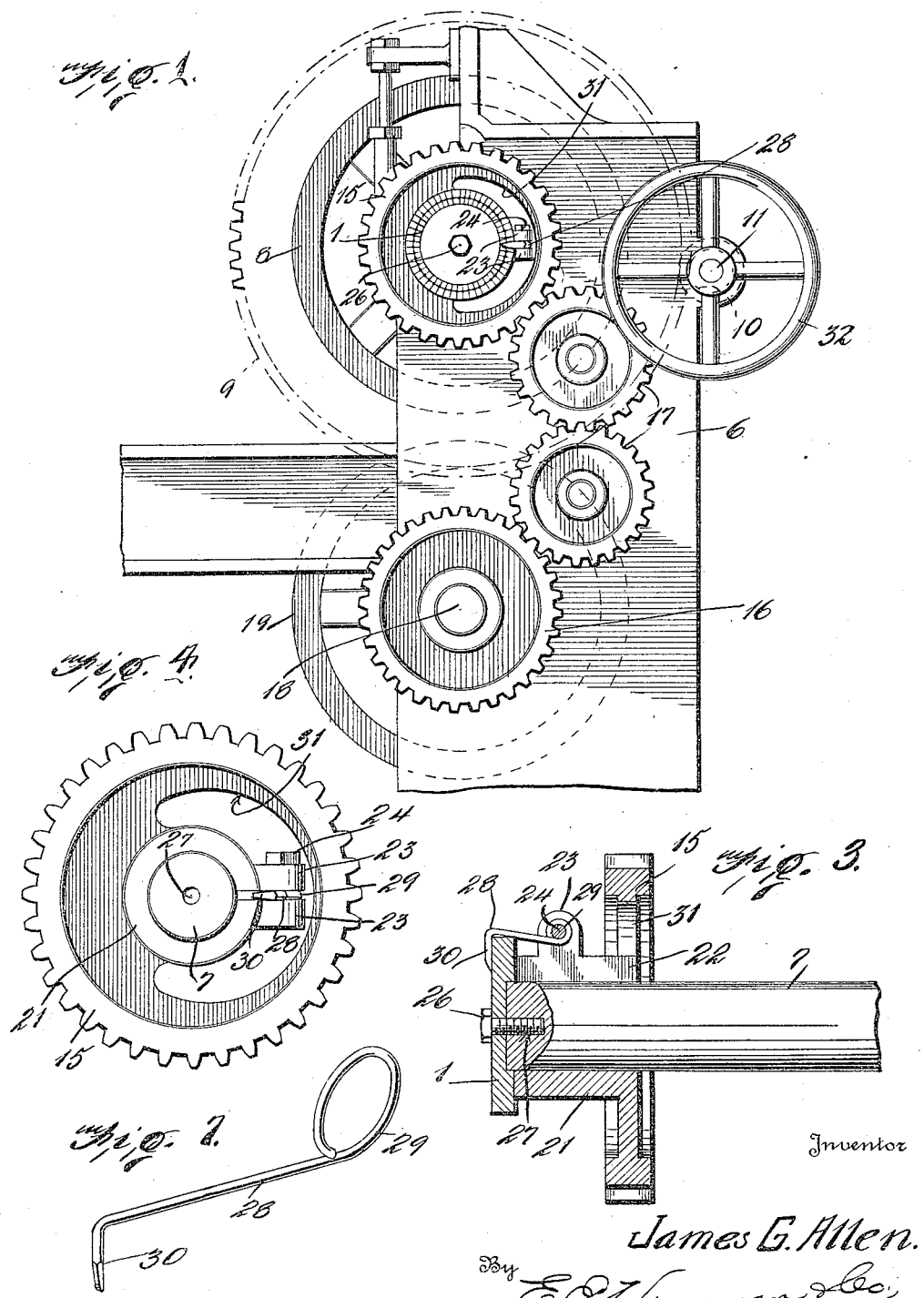

UNITED STATES PATENT OFFICE.

JAMES GLENN ALLEN, OF HAZEL HURST, PENNSYLVANIA.

INDICATOR FOR STAMPING-MACHINES.

1,219,418.  Specification of Letters Patent.  Patented Mar. 20, 1917.

Application filed June 28, 1915. Serial No. 36,822.

*To all whom it may concern:*

Be it known that I, JAMES G. ALLEN, a citizen of the United States, residing at Hazel Hurst, in the county of McKean and State of Pennsylvania, have invented certain new and useful Improvements in Indicators for Stamping-Machines, of which the following is a specification, reference being had therein to the accompanying drawing.

This invention relates to indicator for stamping machines, and has for its principal object the production of a device which will facilitate the adjustment of the machine as the occasion may require.

Another object of this invention is the production of a dial which is adapted to be used in connection with an indicator arm, whereby upon the adjustment of the stamping machine in connection with which the device is to be used, the dial may be moved until the indicator arm rests adjacent a certain portion thereof, whereby the machine may be readily and accurately adjusted.

With these and other objects in view, this invention consists of certain novel combinations, constructions, and arrangements of parts as will be hereinafter fully described and claimed.

In the accompanying drawings:

Figure 1 is a side elevation of a stamping machine showing the dial carried thereon.

Fig. 2 is a side elevation of the dial in use, showing the machine supporting the same in fragmentary front elevation.

Fig. 3 is a central longitudinal section through a portion of the device illustrating the manner in which the dial is supported.

Fig. 4 is a side elevation of a portion of the machine showing the indicator carried thereby, the dial being removed.

Fig. 5 is a front elevation of the dial.

Fig. 6 is a detailed perspective view of the rear portions of the dial.

Fig. 7 is a detailed perspective view of the indicator arm.

Referring to the accompanying drawings by numerals, it will be seen that the dial comprises a flat circular body 1 having a shallow socket 2 formed in its rear surface. An opening 3 extends through the central portion of the dial so as to communicate with the central portion of the socket 2, as clearly shown in Fig. 6. The forward face of the dial 1, is provided with a plurality of indicating numerals 4 which are separated by the lines 5.

The stamping machine in connection with which the dial is adapted to be used preferably comprises a frame 6 having a rotatable shaft 7 upon which the stencil drum 8 is fixedly keyed. One end of this shaft 7 is provided with a gear 9 meshing with the gear 10. This gear 10 is keyed to the shaft 11 mounted upon the frame 6, so that when rotary motion is imparted to the shaft 11 by means of the fixed pulley 12, the gear 9 will rotate the shaft 7 so as to impart rotary motion to the stencil drum 8. An idle pulley 13 may also be carried upon the shaft 11, so that the belt 14 when so desired, may be shifted to the idle pulley 13 so as to impart rotary motion to the idle pulley without operating the machine.

The loose gear 15 is mounted upon the opposite end of the shaft 7, and is connected to the gear 16 by means of the reduced gears 17. The gear 16 is mounted upon the shaft 18 which supports the feed drum 19. This feed drum 19 is provided with feed chains 20, which are adapted to draw material to be stamped between the drums 8 and 19, when the stamping machine is in operation. The loose gear 15 is provided with a grip hub 21, which is split longitudinally upon one side, as shown at 22. Clamping ears 23 are carried by the grip hub 21, in parallel spaced relation as clearly shown in Fig. 4. The set screw 24 is adapted to be passed through these ears 23, whereby when the set screw 24 is rotated so as to draw the ears 23 toward each other, the grip hub 21 will be clamped upon one end of the shaft 7. At this time the machine may be started, so as to cause the shaft 7 to rotate the stencil drum 8, and at the same time cause the loose gear 15 to be rotated by means of the grip hub clamped thereon. As this gear 15 is rotated, it will impart rotary motion to the gears 17 and 16 and the shaft 18, whereby the feed drum 19 will be rotated in unison with the stencil drum 8. This stencil drum 8 is adapted to carry the desired stencil, and is provided with an even roller 25 for connecting the stencils thereon, whereby material passing between the two rollers will be stamped. It is very desirable when using a machine of this character to provide a simple and efficient means for calculating exactly the adjustment of one drum in relation to the other, owing to the fact that it is necessary that the drums be adjusted because of the work or material which is passed therebetween. In order to accomplish this adjustment the dial 1 is positioned upon the outer end of the shaft 7 by allowing the shaft 7 to fit within the shallow socket 2, as clearly shown in Fig. 3. The retaining set screw 26 is passed through the opening 3 formed in the central portion of the dial 1, so as to pass within the threaded opening 27 formed in the outer end of the shaft 7. This retaining set screw will positively fix the dial 1 in a set position upon the outer end of the shaft 7, in which position the board 1 is adapted to permanently remain. At this time the inner surface of the dial will be bearing against the outer end of the grip hub 21. The outer end of this grip hub 21 terminates at a distance from the end of the shaft 7 for accommodating the dial 1. The indicator arm 28 has a coiled eye 29 at its inner end, which fits upon the set screw 24. Therefore, the outer depending end 30 of the indicator arm 28 will be carried at a distance from the ears 23 so as to overhang the forward portions of the grip hub 21. When the dial is in position this depending end 30 will overhang the numerals 4 of the dial 1, as clearly shown in Figs. 1 and 3.

When it is desired to adjust the machine, the set screw 24 is loosened, whereby the grip hub 21 is relieved from its clamping action. It will be noted that the gear 15 is provided with a cut-out portion 31, which allows sufficient space for the slight play of the grip hub and ears. It is, of course, obvious that only a very slight play is required so as to allow the hub to expand, so as to allow the gear 15 to remain loose or idle upon the shaft 7. At this time the indicator arm 28 will have its depending end 30 overhanging the outer surfaces of the dial 1. The manual adjustment wheel 32 may be gripped and turned so as to rotate the shaft 11. At this time the belt will be carried by the idle pulley 13 so that the machine will not be in operation. The rotary motion imparted to the shaft 11 will be imparted by the gear 10 to the gear 9 and thence to the shaft 7, so as to turn the stencil drum 8. The shaft 7 having the board 1 fixedly mounted thereon, will at this time impart a rotary motion to the dial. At this time, as above stated, the gear 15 will remain inactive upon the shaft 7 for it will be prevented from turning owing to the fact that the gears 16 and 17 will mesh therewith and will retain the gear 15 in a set position. As the depending end 30 will not move at this time, the rotation of the dial 1 will cause the numerals to pass by the depending end 30, until the numerals indicating the adjustment of the dial will come into registry with the depending end 30 of the indicator arm 28. All the time the dial is being moved the stencil drum is being moved, and therefore the adjustment of the stencil drum 8 will take place relative to the feed drum 19, since this feed drum has remained inactive or inoperable. As soon as the drums have been adjusted relative to each other, and as shown by the indicator, the set screw 24 may be tightened so as to draw the ears 23 toward each other, thereby fixing the grip hub 21 upon the shaft 7. The belt may then be drawn to the pulley 12 whereby the stamping machine may be started in this new adjusted position.

In the use of stamping machines at present, the drums are capable of adjustment relative to each other, but no means is provided for indicating the accurate adjustment as can be ascertained when using the dial and indicator as described. Without referring to the drums whatever, the operator can grip the wheel 32 and by turning the same he can readily adjust the machine merely by looking at the dial and indicator arm which is carried there-adjacent, as clearly shown in Fig. 1. As soon as the adjustment desired has been ascertained, the several portions may again be tightened as above set forth, at which time the machine is ready for use.

From the foregoing description, it will be seen that a very simple and efficient indicating means has been provided in the form of a dial and indicator arm, which are carried so as to allow the indicator arm to indicate a desired adjustment upon the dial, when the dial is rotated thereby, whereby a stamping machine may be very quickly and accurately adjusted according to the work which the same is required to do.

What is claimed is:

1. In a device of the class described, the combination of a dial having graduations formed thereon, said dial being provided with a shallow socket formed in its rear portions and with an opening extending through the central portions thereof, whereby the end of a shaft may fit within said socket for holding said dial against lateral displacement, said opening being adapted to receive securing means whereby said dial will be held upon a shaft, and an indicator arm overhanging the graduations of said dial, said indicator arm being adapted to be carried by a gear, whereby said dial may be moved until a desired graduation moves into alinement with said indicator arm, whereby the shaft will be adjusted with respect to a gear.

2. In a device of the class described, the combination of a shaft, a gear loosely mounted upon said shaft, a dial fixedly mounted upon the end of said shaft, a grip hub formed upon said gear, said grip hub being split longitudinally, an indicator arm carried by said grip hub and overhanging the graduations of said dial, said dial being adapted to be moved so as to allow a desired graduation to come into alinement with said indicator arm, whereby said shaft may be adjusted with respect to said gear, and means for clamping said grip hub upon said shaft for allowing said shaft and gear to rotate as a unit.

3. In a device of the class described, the combination of a shaft, a loose gear mounted upon said shaft, a grip hub formed upon said hub being split longitudinally, said shaft being adapted to be adjusted with respect to said gear, means carried by said shaft and said gear for determining the degree of adjustment of said shaft and gear, and means for binding said grip hub upon said shaft, whereby said shaft and gear may rotate as a unit.

4. In a device of the class described, the combination of a shaft, a gear loosely mounted upon said shaft, a grip hub formed upon said gear, said grip hub being formed with integral ears having threaded alined openings, a screw carried by said openings, said shaft being adapted to be adjusted with respect to said gear, and means carried by said shaft and gear for indicating the degree to which the shaft and gear are adjusted, said screw being adapted to be rotated for drawing said ears toward each other, whereby said hub will grip said shaft for causing said gear to rotate with said shaft.

5. In a device of the class described, the combination of a shaft, a gear loosely mounted upon said shaft, a grip hub formed upon said gear, said grip hub being provided with integral ears having threaded alined openings, a screw carried by said openings, a dial carried by said shaft, said dial being provided with graduations on its forward face, an indicator arm comprising a straight body having a coiled eye at one end and a depending end at the opposite end thereof, said eye fitting about said screw and between said ears, said depending end overhanging the forward face of said dial, said shaft being adapted to be turned for rotating said dial whereby a desired graduation will come into alinement with said depending end, thereby allowing the degree of adjustment of said shaft and gear to be determined, said screw then being adapted to draw said ears toward each other so as to cause said grip hub to bind upon said shaft for rotating therewith.

In testimony whereof I hereunto affix my signature.

JAMES GLENN ALLEN.

Copies of this patent may be obtained for five cents each, by addressing the "Commissioner of Patents, Washington, D. C."